United States Patent [19]

Carre

[11] Patent Number: 4,712,840
[45] Date of Patent: Dec. 15, 1987

[54] DECELERATION-RESPONSIVE BRAKING CORRECTOR

[75] Inventor: Jean-Jacques Carre, Le Raincy, France

[73] Assignee: Bendix France, Paris, France

[21] Appl. No.: 871,749

[22] Filed: Jun. 9, 1986

[30] Foreign Application Priority Data

Jun. 20, 1985 [FR] France .................. 85 09368

[51] Int. Cl.[4] .............................................. B60T 8/28
[52] U.S. Cl. ................................................... 303/24 R
[58] Field of Search ................ 303/24 R, 24 A, 24 B; 303/24 BB, 24 F, 24 C

[56] References Cited

U.S. PATENT DOCUMENTS 3,773,362 11/1973 Lewis ........................... 303/24 C X
4,205,883 6/1980 Gaiser ........................... 303/24 C X
4,431,235 2/1984 Cheron et al. .................... 303/24 C

FOREIGN PATENT DOCUMENTS 0063862 11/1982 European Pat. Off. .
0076751 4/1983 European Pat. Off. .
2911325 1/1980 Fed. Rep. of Germany .
2550747 2/1985 France .
2069637 8/1981 United Kingdom .
2144189 2/1985 United Kingdom .

OTHER PUBLICATIONS

Abstract of Japanese Patent No. 59-192657 (A), vol. 9—No. 57 (M-363)[1780] Mar. 13, 1985—Anti-Skid Device for Automobile.

Primary Examiner—Duane A. Reger
Assistant Examiner—Matthew C. Graham
Attorney, Agent, or Firm—Larry J. Palguta; Ken C. Decker

[57] ABSTRACT

Deceleration-responsive braking corrector for the brake system of a vehicle, comprising a body having a chamber, an inlet which is connected to the chamber and intended to be connected to a pressurized fluid source, and outlet which is connected to the chamber and is intended to be connected to the brakes of the vehicle, characterized in that it comprises a mass which is slidably mounted inside the chamber and is movable in response to the deceleration of the vehicle, a piston pushing the mass toward a rest position and forming a closure element for a shut-off valve, and a by-pass having a restriction which bypasses the shut-off valve and can be sealed off by the mass when the latter moves in response to a deceleration.

9 Claims, 8 Drawing Figures

DECELERATION-RESPONSIVE BRAKING CORRECTOR

The present invention relates to braking correctors which are responsive to the deceleration of the vehicle on which they are mounted.

During braking of a vehicle, it is desirable to limit the braking pressure of the rear wheels relative to the front wheels above a predetermined deceleration threshold, the rear wheels being more particularly subject to locking on account of their reduced load.

French patent application No. 84/17,728 describes a braking corrector which is responsive to the deceleration of the vehicle on which the braking corrector is mounted and which comprises a mass slidably mounted inside the corrector and moveable in response to the deceleration of the vehicle so as to close a valve which controls the brake circuit. The corrector has, in addition, a piston, acted on by a spring having a predetermined calibration, which prevents the mass from moving and closing the valve before the deceleration threshold has reached a predetermined level.

Despite its advantages, this device has slight drawbacks in that the response times may be too long on account of hydrodynamic friction of the mass which is entirely immersed in hydraulic fluid.

It is therefore, an object of the present invention to provide a deceleration-responsive braking corrector having improved response times.

According to the invention there is provided a deceleration-responsive braking corrector for a vehicle brake system, comprising a body having a chamber, an inlet which is connected to the chamber and is intended to be connected to a pressurized fluid source, an outlet which is connected to the chamber and is intended to be connected to the brakes of the vehicle, a mass which is slideably mounted in the chamber and is moveable in response to the deceleration of the vehicle, a piston pushing the mass towards a rest position and forming a closure element for a shut-off valve and a by-pass having a restriction which by-passes the shut-off valve and can be sealed off by the mass when the latter moves in response to a deceleration.

The invention will now be described by way of example with reference to the accompanying drawings in which.

Figure 1:
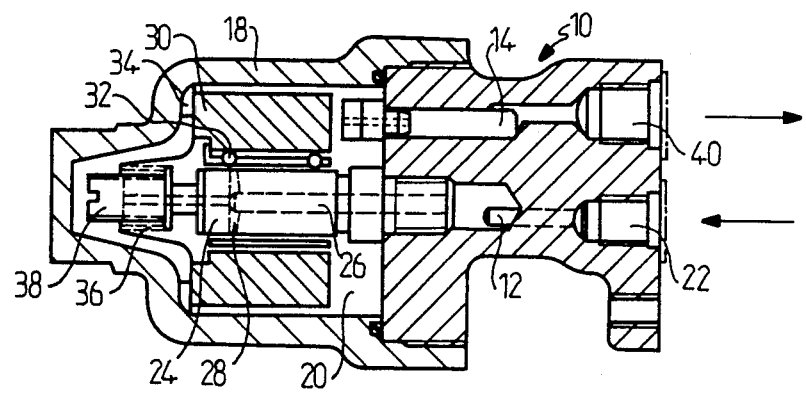
FIGS. 1 and 2 are each a longitudinal section of a braking corrector according to the invention.
Figure 2:
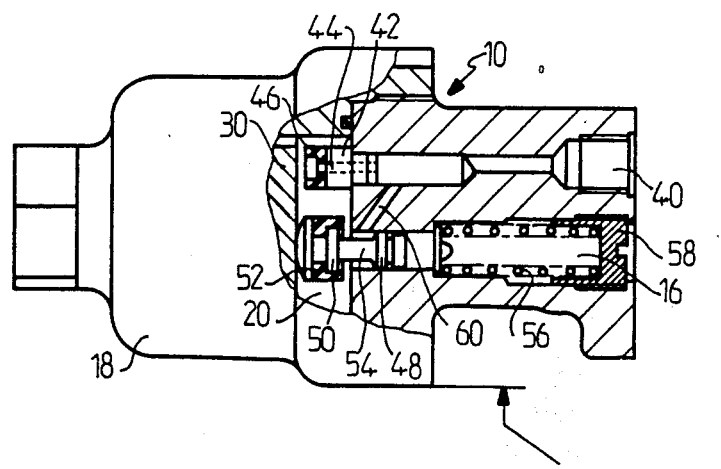

As shown in FIGS. 1 to 5, the braking corrector comprises a body 10 provided with three stepped bores 12, 14 and 16. A casing 18 is fixedly mounted on the body 10 and defines, together with the latter, a chamber 20. The first bore 12 is provided with a threaded inlet orifice 22 which is intended to be connected to a pressurized-fluid generator (not shown), for example a master cylinder. At the other end of the bore 12 there is fixedly mounted an axial member 24 which comprises a longitudinal bore 26 connected to a transverse opening 28. An annular mass 30 is slidably mounted on the axial member 24 by means of a ball bearing 32. The mass 30 is normally kept in its rest position, shown in FIG. 1, against a stop 34, by a return spring 36 which is mounted at one end on the axial member 24 by means of an adjustable screw 38.

The second bore 14 has a threaded outlet orifice 40 intended to be connected to the brakes of the rear wheels of the vehicle (not shown). A valve seat 42 is mounted at the other end of the bore 14 and has a longitudinal bore 44 which has a small diameter and is capable of connecting the bore 14 to the chamber 20. The valve seat 42 has a sealing ring 46 which, when the mass comes to rest against the valve seat (as will be described below), co-operates with the mass and closes the bore 44.

The third bore 16 has a stepped piston 48 comprising a head 50, on which a sealing ring 52 is mounted, and a part 54 with a smaller diameter. The piston 48 is pushed to the left—when viewing the drawings—by a spring 56, the calibration of which can be adjusted by means of a screw 58. The two bores 14 and 16 are connected to each other by a side channel 60.

The corrector is mounted in a vehicle so that the longitudinal axis of the corrector is parallel to that of the vehicle, the casing 18 pointing towards the rear.

Figure 3:
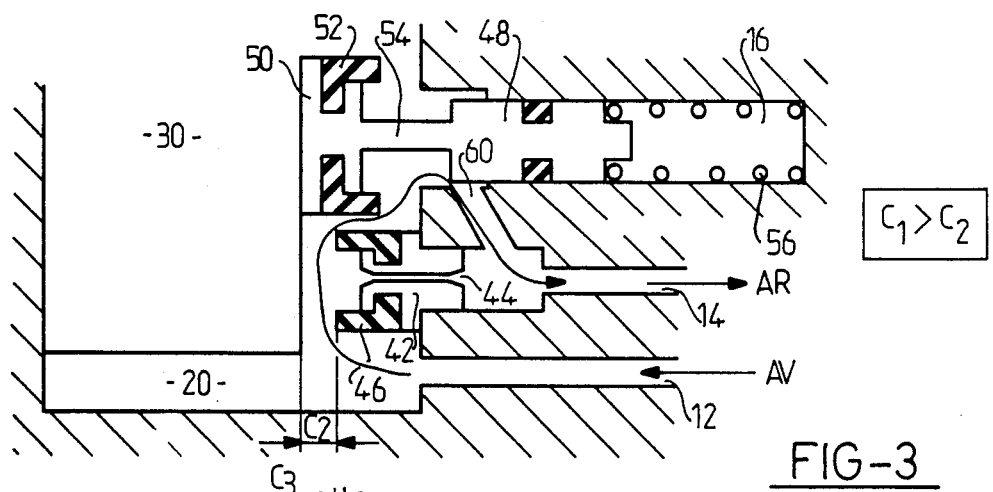
FIGS. 3 to 5 are each a partial longitudinal section, of an embodiment of the invention under different operating conditions.

The corrector thus described operates as follows:

During a first braking phase, for as long as the combination of deceleration and pressure inside the chamber 20 remains below a predetermined threshold, the mass 30 remains immobile against the stop 34 under the combined action of the piston 48 and the return spring 36. As shown in FIG. 3, the hydraulic fluid passes from the master cylinder through the bore 12, the side channel 60 and the bore 14 to the rear brakes of the vehicle. The fluid passes first and foremost through the side channel 60 rather than through the bore 44 on account of the difference in flow resistance. The pressure inside the chamber 20 increases and acts on the surface of the piston 48.

Figure 4:
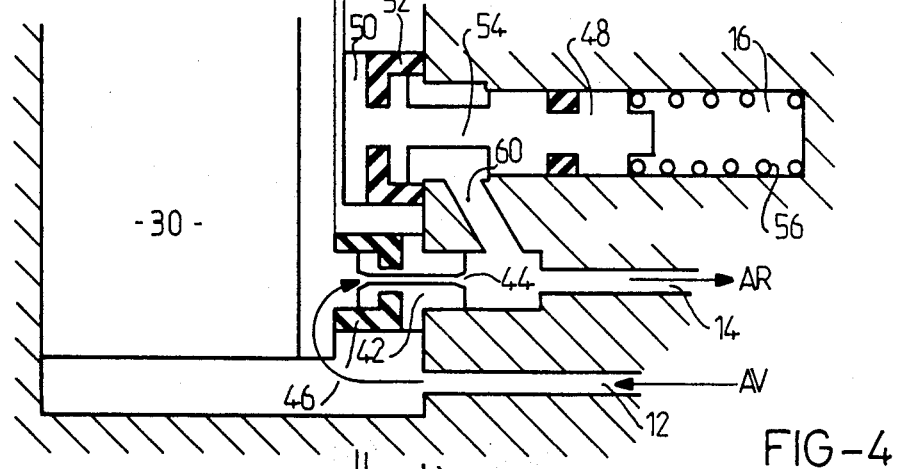

When there is a rapid rise in pressure inside the chamber 20, which exceeds a predetermined threshold, the piston 48 is moved to the right and is brought up against the body 10 of the corrector, as shown in FIG. 4. In this position, the sealing ring 52 closes the side channel 60. The only channel available to the fluid is therefore the bore with the small diameter 44. The increase in pressure of the rear brakes is thus limited by the bore 44.

Figure 5:
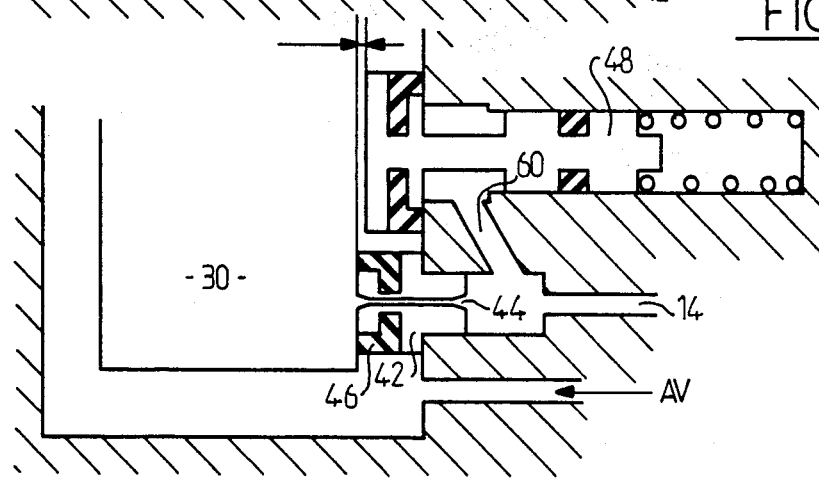

FIG. 5 shows the position of the corrector when the deceleration and pressure thresholds inside the chamber 20 have been exceeded. The mass 30 is moved to the right and is brought up against the sealing ring 46 of the valve seat 42, thereby closing the bore 44. The channel leading to the rear brakes is thus completely closed and the braking pressure in the rear brakes remains unchanged.

Figure 6:
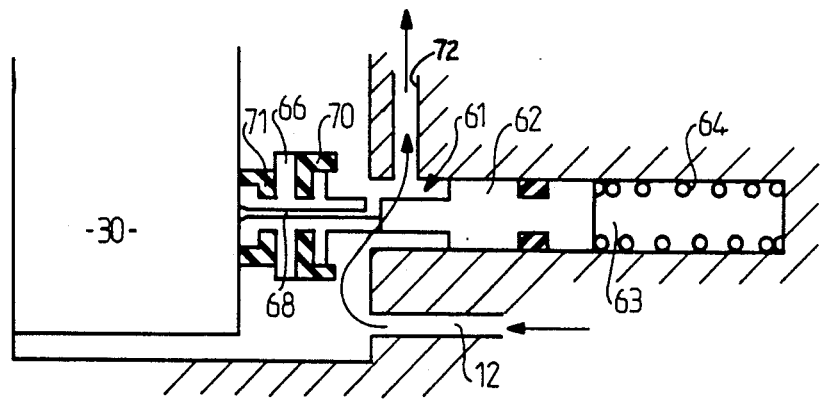
FIGS. 6 to 8 are each a partial longitudinal section, of a second embodiment.
Figure 7:
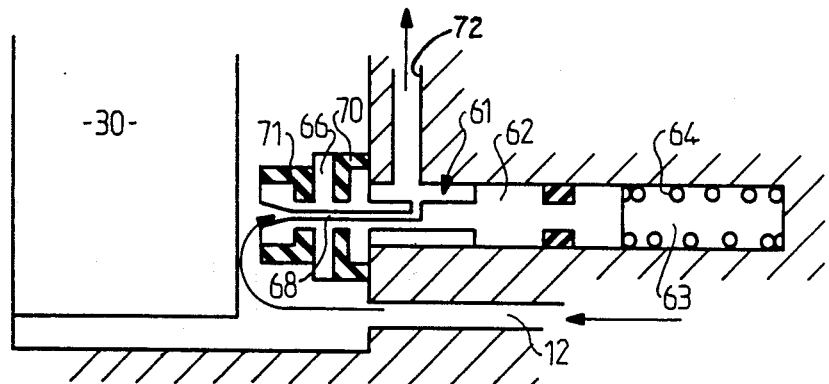
Figure 8:
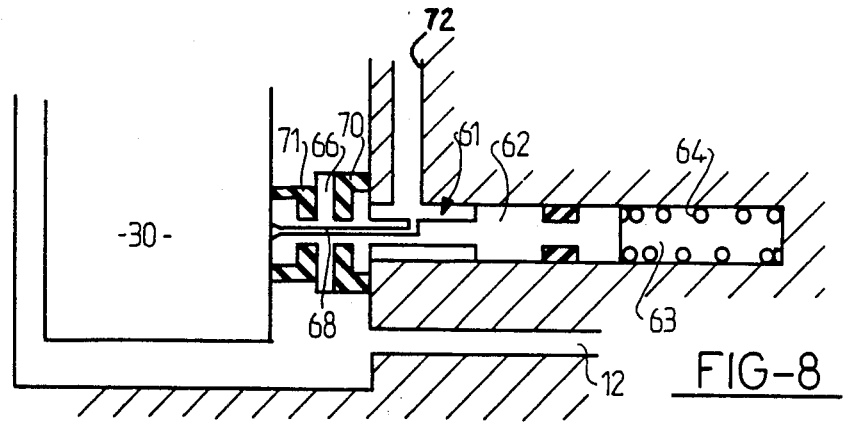

FIGS. 6 to 8 show a second embodiment where the valve seat 42 and the piston 48 are replaced by a single valve means 61 slidably mounted in a bore 63. The valve means comprises a piston member 62 which, like the piston 48, is pushed to the left by an adjustable spring 64. The valve means 61 has, in addition, a valve device 66 comprising a bore 68 with a small diameter and two sealing rings 70, 71.

FIG. 6 shows the corrector in its rest position which it maintains for as long as the combination of deceleration and pressure inside the chamber 20 remains below a predetermined threshold. The mass 30 remains immobile against the stop 34 under the combined action of the return spring 36 and the spring 64 of the valve means 61. The hydraulic fluid is free to pass from the master cylinder through the bore 12 and a bore 72 to the brakes of the vehicle.

When there is a rapid rise in pressure inside the chamber 20, which exceeds a predetermined threshold, the valve means moves to the right and the seal 70 comes up against the body 10 of the corrector, as shown in FIG. 7. In this position, the only flow channel available is therefore the bore 68 with the small diameter. The increase in pressure of the rear brakes is thus limited by the bore 68.

When the combination of pressure and deceleration exceeds the predetermined threshold, the mass 30 moves to the right and comes up against the sealing ring 71, as shown in FIG. 8. The bore 68 is thus closed and the braking pressure of the rear brakes remains unchanged.

I claim:

1. A deceleration-responsive braking corrector for a brake system of a vehicle, comprising a body having a chamber, an inlet connected to the chamber and intended to be connected to a pressurized fluid source, an outlet connected to the chamber and intended to be connected to brakes of the vehicle, characterized in that the corrector comprises a mass which is mounted slidably inside the chamber and movable in response to deceleration of the vehicle, a pressure responsive piston engaging and pushing the mass toward a rest position and forming a closure element for a shut-off valve of a nonrestricted first passage connecting the chamber with the outlet, and a by-pass second passage connecting the chamber with the outlet and having a restriction which bypasses the shut-off valve and which can be sealed off and closed by the mass when the mass moves in response to deceleration, so that closure of the shut-off valve and nonrestricted first passage is effected initially by means of the pressure responsive piston being displaced by pressure and sealing off closure of the restriction occurring sequentially thereafter and effected by the mass.

2. The braking corrector according to claim 1, characterized in that the shut-off valve and the by-pass second passage are arranged in parallel.

3. The braking corrector according to claim 2, characterized in that the first passage and second passage are connected so as to communicate fluid therethrough.

4. The braking corrector according to claim 3, characterized in that the piston is biased toward the mass by a spring disposed in a closed end bore.

5. The braking corrector according to claim 1, characterized in that the shut-off valve and the by-pass second passage are arranged coaxially.

6. The braking corrector according to claim 5, characterized in that the piston is biased toward the mass by a spring disposed in a closed end bore.

7. The braking corrector according to claim 6, characterized in that the pressure responsive piston includes therein the second passage.

8. The braking corrector according to claim 7, characterized in that the second passage is disposed substantially longitudinally in the piston.

9. The braking corrector according to claim 8, characterized in that the piston supports a seal which seals off and encloses the restriction when engaged by the mass.

* * * * *